United States Patent
Pentegov et al.

[15] 3,663,909
[45] May 16, 1972

[54] TRANSFORMER WITH MEANS FOR CONVEYING ELECTRIC ENERGY TO ROTARY CURRENT-COLLECTING DEVICES

[72] Inventors: Igor Vladimirovich Pentegov, Zadorozhny Pereulok, 6, kv. 14; Stephan Ivanovich Semergeev, ulitsa Filatova, 1/22, kv. 13; Sheikovsky, Dmitry Alexeevich, ulitsa Anri Barbjusa, 5a, kv. 22; Sergei Nikolaevich Mescheryak, ulitsa Yanvarskogo Vasstonia, 17a, kv. 6; Evgeny Petrovich Stemkovsky, ulitsa Brigadirskaya, 27, kv. I; Leonid Vladimirovich Litvin, ulitsa Vernadskago, 61, kv. 3; Nikolai Antonovich Shelest, ulitsa Uritskogo, 39, kv. 78, all of Kiev, U.S.S.R.

[22] Filed: Mar. 2, 1971

[21] Appl. No.: 120,194

[30] Foreign Application Priority Data

Mar. 6, 1970 U.S.S.R..................................140745

[52] U.S. Cl..................................336/55, 219/63, 336/175, 336/222
[51] Int. Cl.........................................H01f 17/06
[58] Field of Search..................336/55, 58, 60, 62, 175, 174, 336/173, 222; 219/63

[56] References Cited

UNITED STATES PATENTS 3,154,757  10/1964  Hannon..............................336/175

Primary Examiner—Thomas J. Kozma
Attorney—Holman & Stern

[57] ABSTRACT

A transformer with means for conveying electric energy to rotary current-collecting devices, having a stationary core carrying a primary winding and at least one secondary winding having at least one turn free to rotate about a curved axis which is the locus of the centers of gravity of the cross-sections of this turn, and wherein the leads of the turn are made fast to said current-collecting devices.

7 Claims, 4 Drawing Figures

TRANSFORMER WITH MEANS FOR CONVEYING ELECTRIC ENERGY TO ROTARY CURRENT-COLLECTING DEVICES

The present invention relates to electrical apparatus, and more specifically to transformers with means for conveying electric energy to rotary current-collecting devices, and which may be used in machines where the transformer output current must be applied to rotary current-collecting devices, such as in resistance seam welding machines, for conveying the welding current to the rotating shafts of the welding roller electrodes.

In the prior art, there are transformers with means for conveying alternating current to, say, the rotating shafts of welding roller electrodes in resistance seam welding machines, where use in made of spring-loaded rubbing contacts.

This principle of conveying transformed current to the shafts of welding roller electrodes is utilized, for example, by the Languepin company.

However, these prior-art transformers with means for conveying electric energy to rotary current-collecting devices with rubbing contacts suffer from a number of serious disadvantages.

A rubbing contact offers a considerable resistance in circuits carrying a heavy load current and is subject to marked heating, so that some cooling means have to be provided.

The considerable contact pressure which would have to be employed so as to minimize the contact resistance results in an increased torque on the shaft of the current-collecting device, which in turn calls for a high-power drive.

The use of rubbing contacts in, say, resistance seam welding machines, also complicates the construction of the drive and welding-actuation mechanisms and adds to their inertia.

Furthermore, during a prolonged term of service a rubbing contact is subject to increased wear, which fact causes variations in the resistance of the associated circuit and, as a consequence, in the welding current.

Rubbing contacts further necessitate the use of an anti-friction grease (for example, graphite), which complicates their servicing and also affects the contact resistance. Servicing of rubbing contacts which use grease is very complicated under conditions of, say, vacuum or at elevated temperatures. Finally, the prior-art devices with rubbing contacts when used under conditions of high vacuum (for example, in outer space) will not operate at all because of the increased grip between the metals along the friction surfaces.

It is an object of the present invention to avoid these disadvantages.

The invention aims at providing a transformer with means of conveying electric energy to rotary current-collecting devices, which reduces the contact resistance to a minimum and keeps it constant.

With this aim in view, the invention provides a transformer with means for conveying electric energy to rotary current-collecting devices, the transformer having a stationary core carrying a primary winding and at least one secondary winding, and, according to the invention, this secondary winding has at least one turn free to rotate about a curved axis which is the locus of the centers of gravity of the cross-sections of this turn, and the leads of this turn are made fast to said current-collecting devices.

It is preferable either to make the secondary-winding turn flexible or to make the parts of the turn located on the core in the form of rigid shafts fastened to the flexible portions of this turn.

The secondary-winding turn may also be reinforced with a flexible shaft.

It is also envisaged to make the secondary-winding turn in the form of a flexible pipe filled with a current-conducting liquid.

The transformer disclosed herein may have a core-mounted insulating duct enclosing the secondary-winding turn.

The secondary-winding turn may have a cooling system.

The invention will be more fully understood from the following description of preferred embodiments when read in connection with the accompanying drawings wherein.

A transformer with means for conveying electric energy to rotary current-collecting devices is described with reference to an embodiment intended for use in a resistance seam welding machine.

Figure 1:
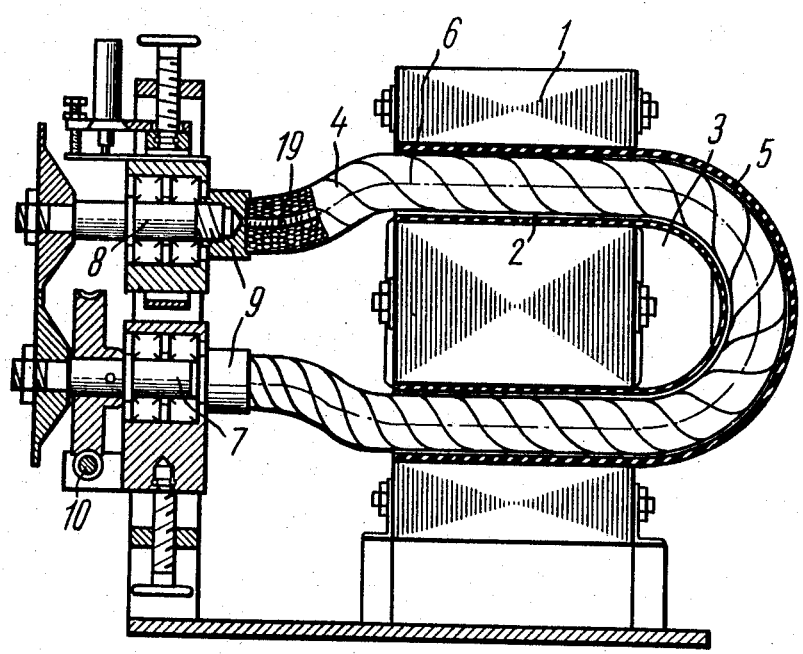
FIG. 1 is a general view of a transformer cut in the plane of the secondary winding, with a flexible secondary-winding turn, according to the invention.

Referring to FIG. 1, there is a transformer which comprises a stationary core 1 with openings 2, a primary winding 3 and a secondary winding 4, placed in these openings. The secondary winding 4 in this embodiment has one turn. The openings 2 of the core 1 also have a guide duct 5 made of an insulating material, which encloses this secondary-winding turn 4 so that it can rotate about a curved axis 6 which is the locus of the centers of gravity of the cross-sections of this turn.

This secondary-winding turn 4 may be made, for example, in the form of standard flexible cable, and the guide duct 5 may be filled with anti-friction grease in order to reduce frictional resistance as the turn 4 rotates.

The leads of the turn 4 are made fast in an electrically conductive manner to current-collecting devices 7 and 8. This fastening may be permanent, by welding or brazing, or demountable, by using a coupler. In the case on hand (see FIGS. 1 and 3) the turn 4 is made fast to the current-collecting devices 7 and 8 by means of threaded couplers 9. The current-collecting device 7 is actuated by a drive 10.

The parts of the turn 4 located in the openings 2 of the core 1 may be made in the form of rigid shafts 11 (FIG. 2) made fast coaxially to the current-collecting devices 7 and 8 on one side, and inter-coupled by a flexible part 12 of the same turn 4 on the other side. In this case, the openings 2 in the core 1 are made so as to provide for the requisite change in the center-to-center distance between the current-collecting devices 7 and 8 and the current-collecting devices 7 and 8 are mounted on bearings 13 so as to reduce friction resistance as the turn 4 is rotated.

When the rigid shafts 14 (FIG. 3) of the turn 4 are mounted in the openings 2 of the core 1 on bearings 15, their ends are inter-coupled by the flexible part 12 of the turn 4 on one side, and by flexible leads 16 of the same turn 4 on the other side. In turn, the flexible leads 16 of the turn 4 are made fast to the rotary current-collecting device 7 and 8. The flexible leads 16 are fabricated and made fast to the current-collecting devices 7 and 8 in the same way as the flexible turn 4 of FIG. 1.

Figure 3:
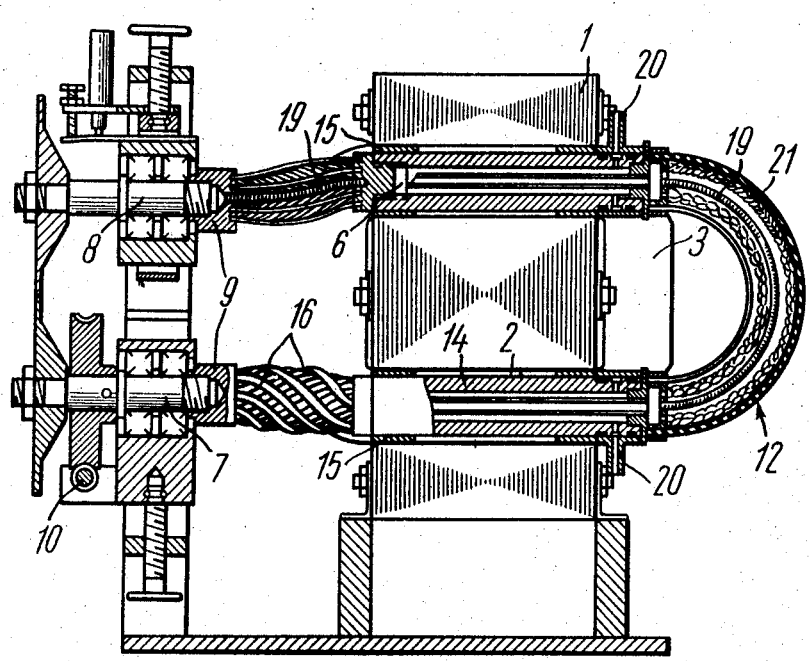
FIG. 3 is a general view of a transformer, cut in the plane of the secondary winding, with a secondary-winding turn made in the form of rigid shafts separated between themselves and from rotary current-collecting devices by flexible elements, according to the invention.

When thus constructed the turn 4 may be rotated about a curved axis 6 by a drive 10 through a transmission (not shown in the drawings), such as gear, chain, V-belt, or any other type between the shafts 14 (FIG. 3).

When the rotary current-collecting device 7 and 8 are inter-coupled by an integral flexible turn, it may alternatively be made in the form of a flexible pipe filled with a current-conducting liquid (not shown in the drawings).

Figure 4:
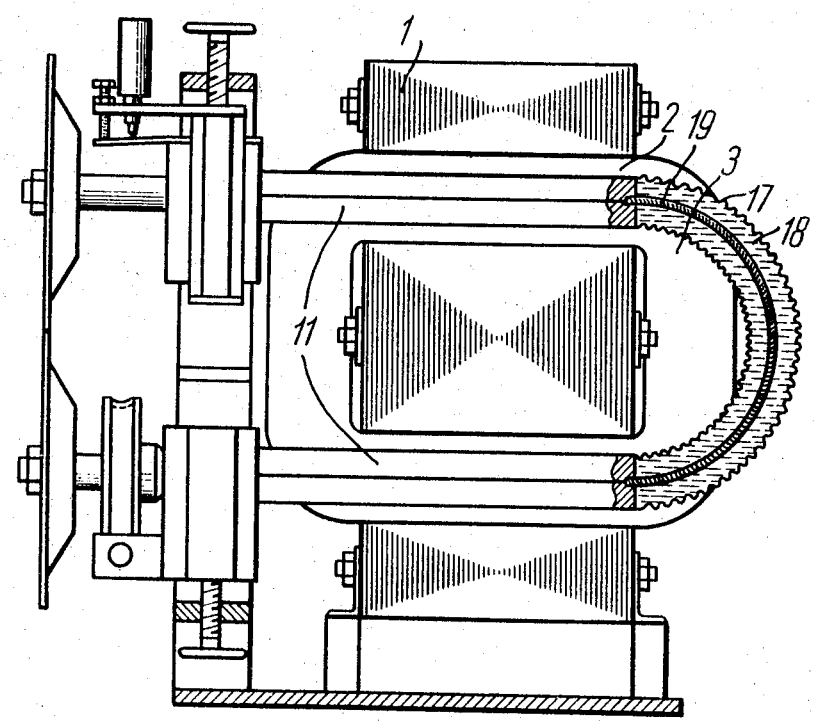
FIG. 4 is a general view of a transformer, cut in the plane of the secondary winding, with a secondary-winding turn made in the form of a flexible pipe filled with a liquid-metal conductor, according to the invention.

As a modification of this embodiment, the portion of the turn which connects the ends of the rigid shafts 11 (FIG. 4) may be made in the form of a flexible pipe 17 (FIG. 4) filled with a current-conducting liquid 18.

The turn 4 in all of the above-described embodiments shown in FIGS. 1, 2, 3, and 4, may be reinforced, fully or in part, with a flexible shaft 19 intended to transmit the torque from one current-collecting device to the other.

Figure 2:
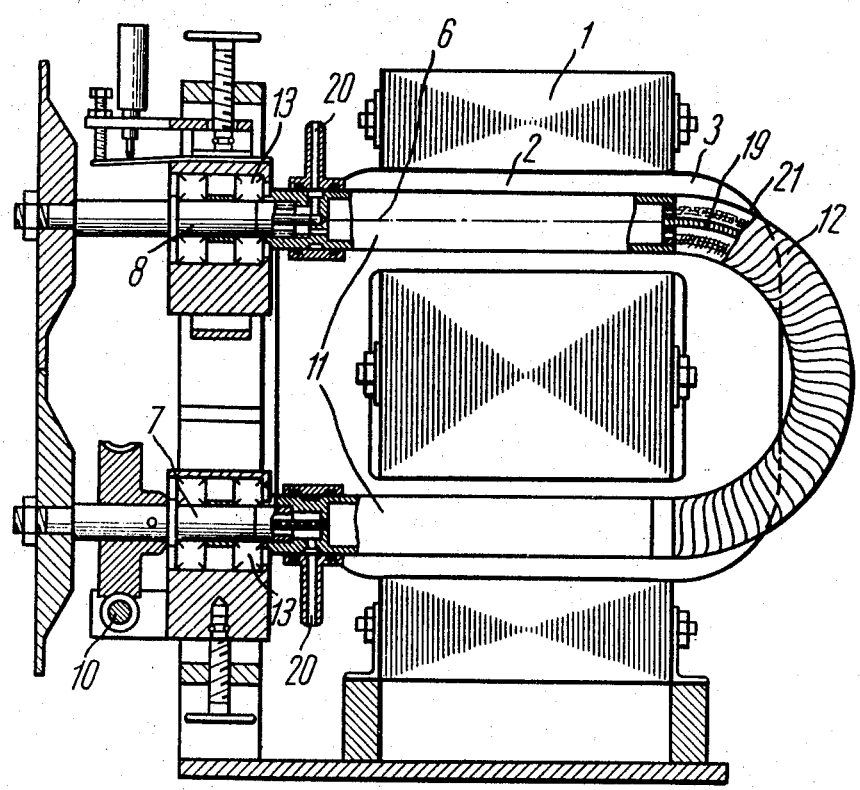
FIG. 2 is a general view of a transformer, cut in the plane of the secondary winding, with a secondary-winding turn made in the form of rigid shafts made fast to the flexible portions of the secondary-winding turn, according to the invention.

In the embodiment of FIGS. 2 and 3, the turn 4 has a cooling system with inlet and outlet pipe unions 20. In this case, an elastic sleeve 21 is slipped over the flexible portions of the turn, so as to cool the entire turn with cooling liquid.

The transformer with a rotating secondary-winding turn disclosed herein operates as follows.

When the drive 10 (FIG. 1) is turned on, rotation of the current-collecting device 7 is transmitted to the current-collecting device 8.

Since the rotary current-collecting devices 7 and 8 are made fast in an electrically conductive manner to the leads of the turn 4, the torque is transmitted to the turn 4, and it begins to rotate about a curved axis 6 which is the locus of the centers of gravity of its cross-sections.

Since both the primary winding 3 and the secondary winding 4 are placed on the same core 1, energization of the primary winding 3 from a supply source (not shown in the drawings) induces in the secondary winding 4 an EMF which gives rise to a flow of current in the secondary-winding turn when it is closed by an electrical load such as of welding. The EMF induced in the secondary-winding turn 4 is fed to the rotary current-collecting devices 7 and 8 directly, without any rubbing contacts whatsoever.

The primary winding 3 of the transformer may be connected to any supply source, a.c. at power and elevated frequencies, or pulse-type such as a bank of capacitors, etc.

The transformer disclosed herein, with all other embodiments of the rotating secondary-winding turn 4 (see FIGS. 1, 2, 3, and 4), operates in a similar manner.

The invention may be utilized to transform currents and voltages at power and elevated frequencies, and also single pulses (such as supplied by a capacitor discharge) and at the same time to convey the resultant current without any rubbing contacts to rotating shafts, rollers, electrodes and other current-collecting devices.

It will prove especially efficient in circuits with heavy load currents, such as in resistance seam welding where it is essential to keep the resistance of the welding circuit constant, and also to reduce to a minimum the frictional torque of the welding roller electrodes.

When the transformer disclosed herein is used for the resistance seam welding of moving workpieces, no separate drive is required to actuate the secondary-winding turn of the transformer.

When used in suspension-type welding tongs, the transformer disclosed herein will reduce their weight and size and also the power rating of the drive of one of the roller electrodes. The other roller electrode requires no separate drive, and their relative slippage is prevented.

The absence of rubbing metal contacts opens up broad possibilities for the use of the invention in apparatus operating in outer space and in controlled atmospheres.

What is claimed is:

1. A transformer assembly for conveying transformed electric energy from a power source to rotary current-collecting devices, comprising: a magnetizable core; a primary winding inductively associated with said core; a secondary winding inductively associated with the core and having at least one turn disposed so as to rotate about a curved axis which is the locus of the centers of gravity of cross-sections of this said turn; rotary current-collecting devices which are electrically connected to winding leads of the transformer secondary; and means to rotate said secondary winding about said curved axis.

2. A transformer assembly as claimed in claim 1, in which said secondary-winding turn is made at least partly flexible.

3. A transformer assembly as claimed in claim 1, in which the secondary-winding turn includes two substantially parallelly disposed, spaced rigid shafts in proximity to the core and fastened in conductive relation to flexible parts of said turn.

4. A transformer assembly as claimed in claim 1, in which said secondary-winding turn is reinforced with a flexible shaft running centrally as a core at least in flexible regions of the secondary-winding turn.

5. A transformer assembly as claimed in claim 2, in which said secondary-winding turn is made in the form of a flexible pipe filled with a current-conducting liquid.

6 A transformer assembly as claimed in claim 1, comprising an insulating guide duct secured to said core in which duct the secondary turn is guidingly disposed.

7 A transformer assembly as claimed in claim 1, which includes a cooling system for the secondary winding.

* * * * *